Dec. 15, 1925.
G. SAUER
AUTOMOBILE BUMPER
Filed Aug. 16, 1924
1,565,592
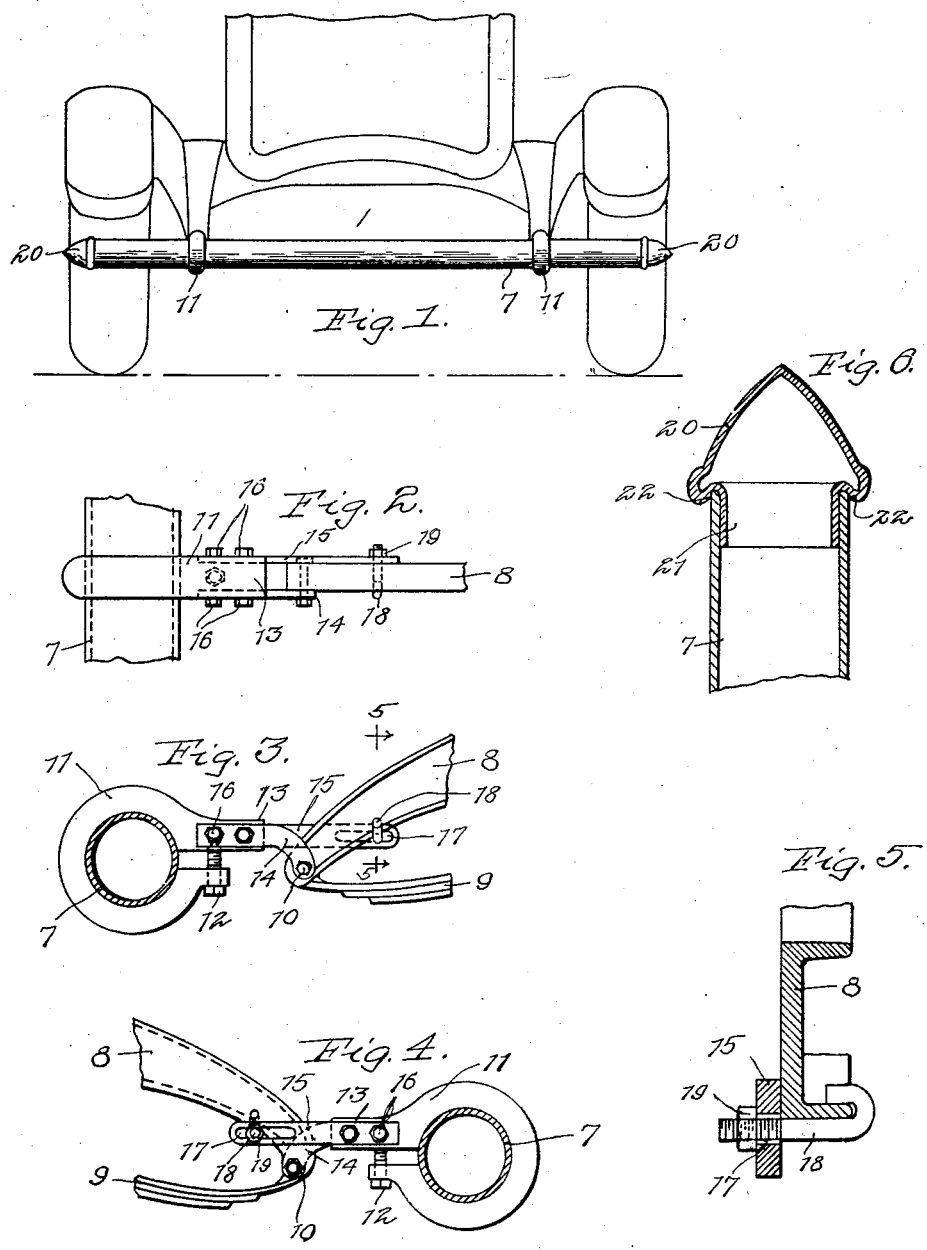
Inventor
George Sauer
By Brown, Boettcher & Dieuwer
Att'ys.

Patented Dec. 15, 1925.

1,565,592

UNITED STATES PATENT OFFICE.

GEORGE SAUER, OF CHICAGO, ILLINOIS, ASSIGNOR, BY MESNE ASSIGNMENTS, TO AUTOMOBILE EQUIPMENT MANUFACTURING CORPORATION, OF CHICAGO, ILLINOIS, A CORPORATION OF ILLINOIS.

AUTOMOBILE BUMPER.

Application filed August 16, 1924. Serial No. 732,373.

*To all whom it may concern:*

Be it known that I, GEORGE SAUER, a citizen of the United States, residing at Chicago, in the county of Cook and State of Illinois, have invented a certain new and useful Improvement in Automobile Bumpers, of which the following is a full, clear, concise, and exact description, reference being had to the accompanying drawings, forming a part of this specification.

My invention relates to automobile bumpers and its object is to provide an improved device in furtherance of simplicity of construction, strength and effectiveness.

My invention is illustrated in the accompanying drawings, which show an embodiment thereof and in which—

Figure 1 is a front elevational view of a portion of an automobile, showing my improved bumper applied thereto;

Figure 2 is a plan view of the improved bracket which I employ, or may employ, as part of my improved bumper;

Figure 3 is a side elevational view of the parts shown in Figure 2;

Figure 4 is an opposite side elevational view of the parts shown in Figure 2;

Figure 5 is a sectional view taken on the plane of the line 5—5 of Figure 3, looking in the direction indicated by the arrows, but on a larger scale; and Figure 6 is a central longitudinal sectional view of the end of the main member and end cap which will be referred to.

The main bumping member 7 of my device is in the form of a cylindrical bar or tube. It is mounted, as will be described, across the front of the automobile and is approximately equal in length to the overall width dimension thereof.

This main member is supported rigidly from the frame 8, 8 of the automobile, the portions of the frame to which it is attached being the usual curved forwardly extending portions of channel formation, one on each side, to which the ends of the springs 9, 9 are connected at the bolts 10, 10.

Two clamping members 11, 11, symmetrically alike, are provided. Each of these members is in the form of a single-split ring, of liberal cross section, and is adapted to encircle the main member 7, as shown, being tightly clamped thereon by means of a cap bolt 12 engaging in extensions on the ends of the ring member.

One end of the split ring member has a further extension 13 to the opposite sides, respectively, of which arms 14 and 15 are secured by means of bolts 16, 16. The extension 13 may be mortised for the reception of these arms, as shown. The arm 14 has a bolt hole in its free end through which the bolt 10 may pass, thus clamping said arm to the end of the frame and forming one bearing point. The other arm 15 has an elongated slot 17 therein through which the end of a hook-bolt 18 may pass. This arm extends along the outside of the frame portion 8, and the hook of the hook-bolt catches over the flange thereof on the inside, a nut 19 being provided on the end of the hook bolt whereby the arm may be tightly clamped between it and the frame portion, thus forming a second bearing point. A slight offset, one way or the other, may be bent into the arm 15 so as to accommodate various thicknesses of the part which is clamped between it and the arm 14. The elongated slot permits of the hook-bolt being disposed therein in any position within its length, and the hook part itself may be disposed at any desired angle.

By this means attachment may be made to various types and forms of automobile frames, and, the main member 7 being of uniform diameter, the two clamping members may be positioned as desired, lengthwise of the main member, for the same purpose. The various parts are made of specially strong material, such as steel.

In Figure 6 I have shown the manner in which the end caps 20, 20 are made and secured to the end of the main member. These end caps are of sheet material, such as sheet steel or brass, and are formed with a cylindrical portion 21 for driving fit in the ends of the member 7. They are also formed with an annular lip 22 within which the end of the member 7 extends with a driving fit, thus tightly clamping the end of the member 7 between the lip and the cylindrical portion 21.

I claim:

1. In combination, a vehicle frame, an automobile bumper comprising a rigid elongated member of uniform cross section, a rigid clamping member surrounding said elongated bumper member and clamped thereto, a rigid arm rigidly attached to the vehicle frame and held against movement relative thereto, bolt means attaching said clamping member to said arm, and means for holding said clamping member and arm rigidly together and against relative movement in a vertical plane upon loosening of said bolt means.

2. An automobile bumper comprising a main bumping member, a pair of separate mounting arms each having all portions thereof in a single plane parallel to all portions of the other, a clamping member having an extension extending parallel to said mounting arms and secured between the ends of said arms and mounted upon said bumping member, one of said arms having an opening therein to receive a bolt, and a hook bolt carried by the other arm.

3. An automobile bumper comprising a main bumping member, a clamping member thereon, said clamping member having depressions on opposite sides thereof, arms having their ends disposed in said depressions and secured to said clamping member, and means for clamping said arms to an automobile frame.

4. In an automobile bumper, a tubular bumping member, and an end cap therefor, said cap having a portion having driving fit in the end of said member and a lip in which the end of said member has driven fit.

5. In an automobile bumper, a tubular bumping member, and an end cap of sheet material, said cap being formed with a cylindrical portion entering the end of said member and with a lip surrounding and spaced slightly from said cylindrical portion, whereby the end of said member is clamped between said cylindrical portion and said lip.

6. In an automobile bumper, a tubular bumper member, and an end cap therefor, said cap having a portion entering the end of the bumper member and a lip surrounding and spaced from said portion to receive the end of the bumper member between it and the portion entering said bumper member.

In witness whereof, I hereunto subscribe my name this 12th day of August, 1924.

GEORGE SAUER.